(12) United States Patent
Elterman et al.

(10) Patent No.: US 9,316,250 B2
(45) Date of Patent: Apr. 19, 2016

(54) BALL JOINT WITH IMPROVED UPPER BEARING AND METHOD OF CONSTRUCTION THEREOF

(71) Applicant: Federal-Mogul Products, Inc., Southfield, MI (US)

(72) Inventors: James Elterman, Byrnes Mill, MO (US); Thomas J. Byrnes, Jr., St. Charles, MO (US); Timmy L. Henson, Maryville, MO (US)

(73) Assignee: Federal-Mogul Products, Inc., Southfield, MI (US)

( * ) Notice: Subject to any disclaimer, the term of this patent is extended or adjusted under 35 U.S.C. 154(b) by 0 days.

(21) Appl. No.: 14/036,119

(22) Filed: Sep. 25, 2013

(65) Prior Publication Data

US 2014/0086667 A1 Mar. 27, 2014

Related U.S. Application Data

(60) Provisional application No. 61/705,445, filed on Sep. 25, 2012.

(51) Int. Cl.
*F16C 11/06* (2006.01)
*B60G 7/00* (2006.01)
(Continued)

(52) U.S. Cl.
CPC ............ *F16C 11/0604* (2013.01); *B60G 7/005* (2013.01); *F16C 11/0623* (2013.01); *F16C 11/0633* (2013.01); *F16C 11/0685* (2013.01); *F16C 33/201* (2013.01); *B60G 2204/416* (2013.01); *F16C 11/068* (2013.01);
(Continued)

(58) Field of Classification Search
CPC .................. F16C 11/06–11/086; F16C 33/22; F16C 2208/02; F16C 2208/04; F16C 33/2015; F16C 2220/04; B60G 7/005; B60G 2204/416; B62D 7/16; B62D 7/166
USPC .......... 403/122, 134, 135, 138, 139, 141–143; 280/93.51, 93.511; 29/898.043
See application file for complete search history.

(56) References Cited

U.S. PATENT DOCUMENTS 3,375,027 A    3/1968  Ulderup
3,650,004 A *  3/1972  Bergstrom .................... 403/140
(Continued)

FOREIGN PATENT DOCUMENTS

GB          967087 A       8/1964

OTHER PUBLICATIONS

"Color Pigments and Dyes." Industrial Polymers Corporation. Dec. 12, 2011, [online], [retrieved on Jun. 26, 2014]. Retrieved from the Internet <URL: https://web.archive.org/web/20111212073639/http://www.industrialpolymers.com/product-list/color-pigments-and-dyes/color-pigments-and-dyes/>.*
(Continued)

*Primary Examiner* — Josh Skroupa
(74) *Attorney, Agent, or Firm* — Robert L. Stearns; Dickinson Wright, PLLC

(57) ABSTRACT

The ball joint includes a housing and a stud with a spherical bearing surface disposed in the housing. The bearing has a concave spherical bearing surface which is brought into sliding abutment with the spherical bearing surface of the stud. The bearing is of a monolithic piece of fiber-reinforced polyamide material and includes carbon fibers which extend circumferentially about the concave spherical bearing surface.

15 Claims, 2 Drawing Sheets

(51) Int. Cl.
*F16C 33/20* (2006.01)
*B62D 7/16* (2006.01)

(52) U.S. Cl.
CPC ......... *F16C2208/02* (2013.01); *F16C 2208/04* (2013.01); *F16C 2208/60* (2013.01); *F16C 2220/04* (2013.01); *Y10T 29/49648* (2015.01); *Y10T 29/49826* (2015.01); *Y10T 403/32631* (2015.01); *Y10T 403/32737* (2015.01)

(56) References Cited

U.S. PATENT DOCUMENTS

| | | | |
|---|---|---|---|
| 3,779,619 A | 12/1973 | Van Dorn et al. | |
| 4,677,721 A * | 7/1987 | Kramer | 29/898.055 |
| 4,770,926 A | 9/1988 | Yamamura et al. | |
| 5,219,231 A | 6/1993 | Sheedy | |
| 5,393,822 A | 2/1995 | Marumoto et al. | |
| 6,340,534 B1 * | 1/2002 | Bickle et al. | 428/626 |
| 6,638,311 B2 | 10/2003 | Wang et al. | |
| 7,140,778 B2 | 11/2006 | Hokkirigawa et al. | |
| 7,182,518 B2 | 2/2007 | Lee et al. | |
| 7,260,878 B2 * | 8/2007 | Kondoh | 29/441.1 |
| 7,320,548 B2 | 1/2008 | Budde | |
| 7,473,035 B2 | 1/2009 | Lee et al. | |
| 8,256,980 B2 * | 9/2012 | Walter et al. | 403/135 |
| 2003/0180089 A1 | 9/2003 | Heuser | |
| 2004/0258334 A1 | 12/2004 | Hokkirigawa et al. | |
| 2005/0169562 A1 | 8/2005 | Lee | |
| 2009/0226244 A1 | 9/2009 | Byrnes, Jr. | |
| 2010/0092119 A1 | 4/2010 | Angenheister | |

OTHER PUBLICATIONS

International Search Report mailed Dec. 20, 2013 (PCT/US2013/061514).

* cited by examiner

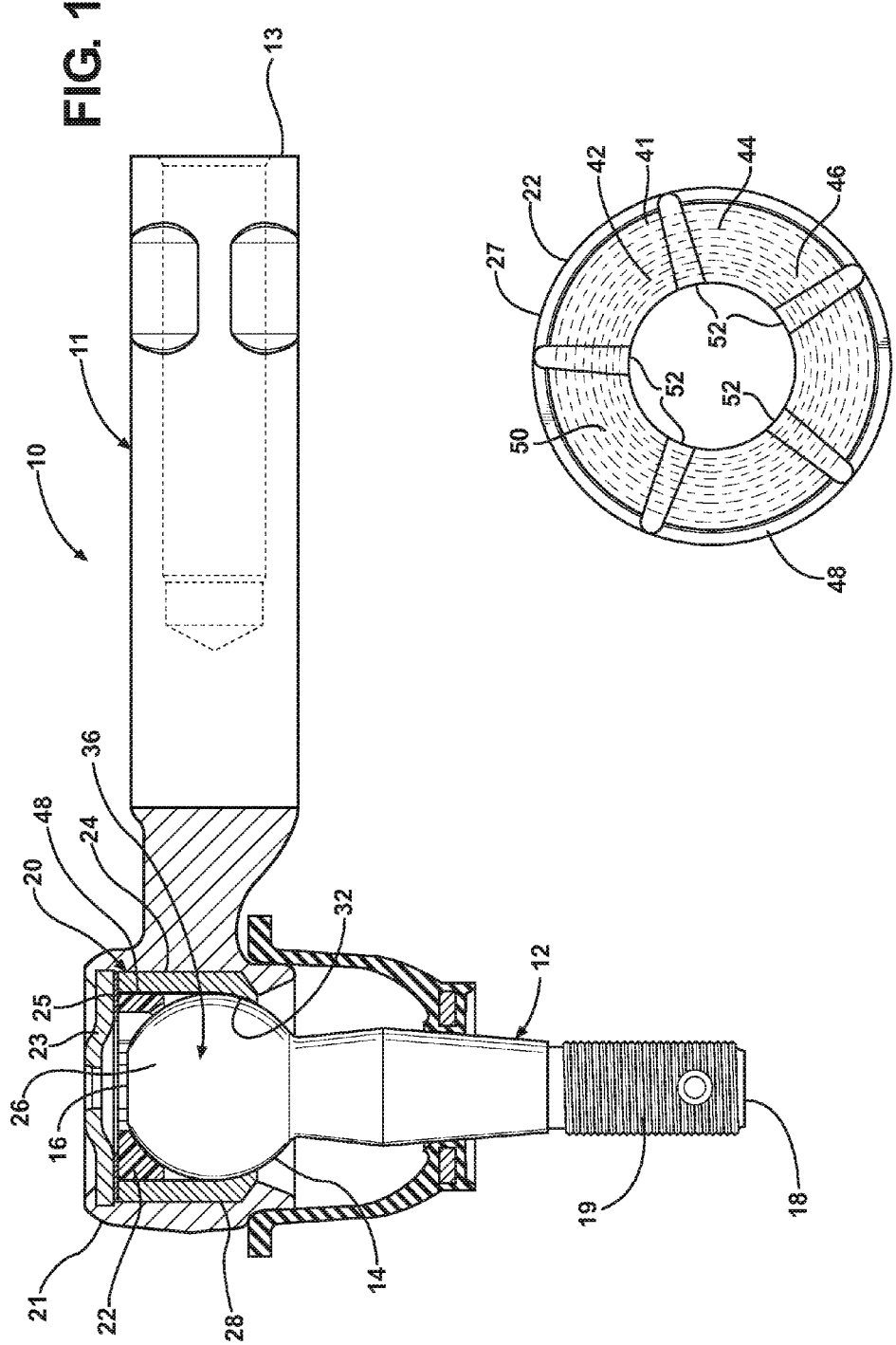

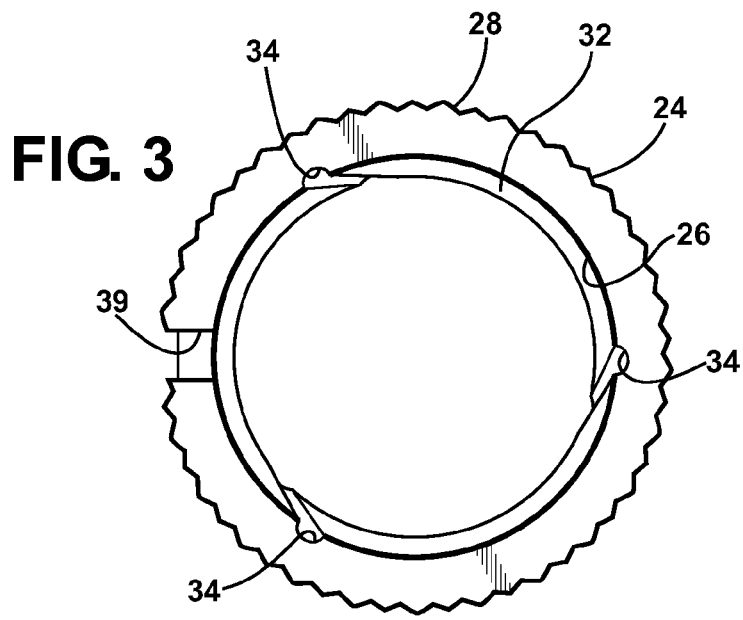
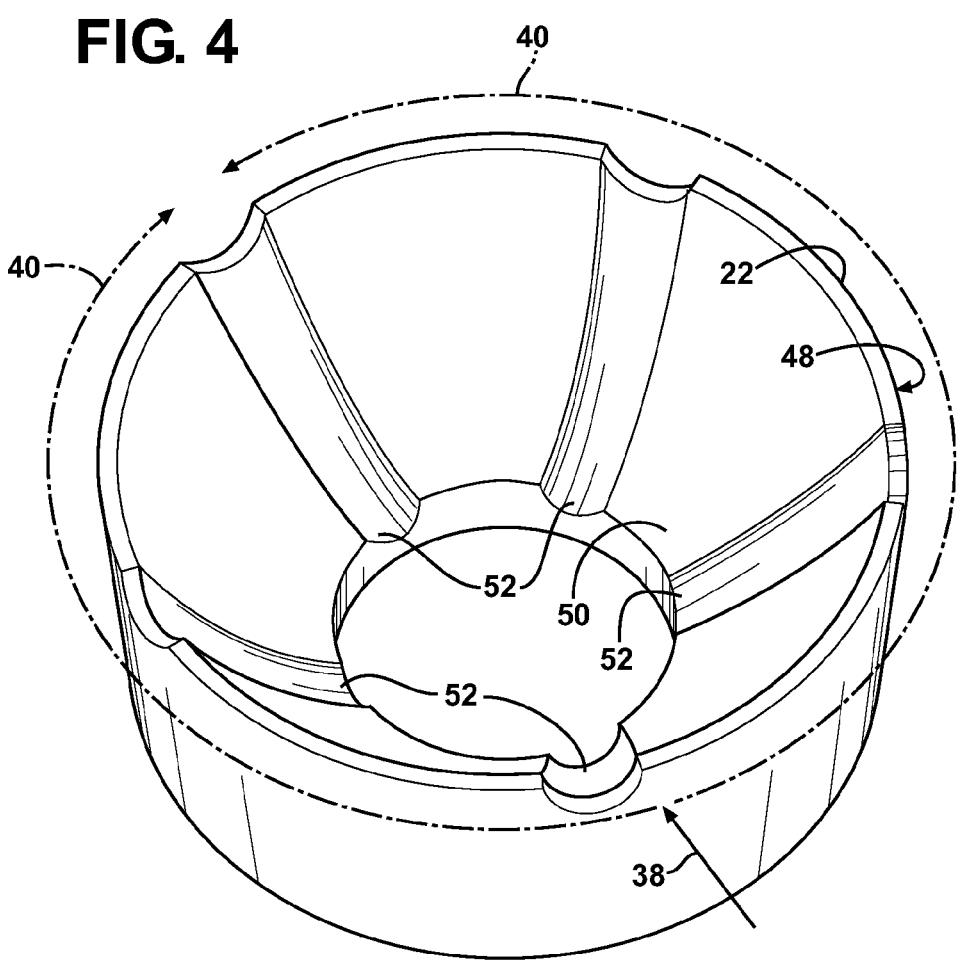

US 9,316,250 B2

BALL JOINT WITH IMPROVED UPPER BEARING AND METHOD OF CONSTRUCTION THEREOF

CROSS-REFERENCE TO RELATED APPLICATION

This application claims the benefit of U.S. Provisional Application Ser. No. 61/705,445, filed Sep. 25, 2012, which is incorporated herein by reference in its entirety.

BACKGROUND OF THE INVENTION

1. Technical Field

This invention relates generally to joints for linking relatively movable vehicle steering components to one another, such as ball joints, tie rod ends, and sway bar links.

2. Related Art

Vehicle suspension systems and steering systems typically include joints, such as tie rod end ball-type joints for operable attachment of a tie rod end to a steering knuckle and a ball joint for coupling the steering knuckle to a control arm. In addition, other applications, such as carnival rides or any other mechanism with relatively movable joints, typically have ball joints to facilitate the relative movement between linked components. Upon assembly of ball joints, it is generally desirable to build in frictional resistance to joint movement that is within a predetermined torque tolerance. In addition, it is essential that the ball joints exhibit a long and useful life, and of additional importance, it is important that the ball joints be economical in manufacture. If the frictional resistance or torque is too high, it may impede the motion of the mechanism and/or make installation difficult. If the frictional resistance is too low, it may result in an undesirable "out-of-box feel".

It is known to construct ball joints from metal, including coated metal bearings against which a metal ball stud pivots. However, although the coated metal bearings can provide a desirable "out-of-box" feel and exhibit a long and useful life, they typically come at a high cost in manufacture.

In an effort to reduce costs associated with manufacture, it is known to construct tie rod end ball joints including acetal or glass-filled nylon bearings against which a metal ball stud pivots. Although the cost of manufacture is greatly reduced, the acetal or glass-filled nylon bearings provide a reduced useful life.

SUMMARY OF THE INVENTION

According to one aspect of the present invention, a ball joint socket is provided including a housing with a stud having a spherical bearing surface disposed in the housing and including a bearing having a concave spherical bearing surface brought into sliding abutment with the spherical bearing surface of the stud. The bearing is of a monolithic piece of fiber-reinforced polyamide material including carbon fibers which extend circumferentially about the concave spherical bearing surface.

In accordance with another aspect of the present invention, the fiber-reinforced polyamide material includes glass fibers and bronze flakes which both extend circumferentially about the concave spherical bearing surface.

In accordance with yet another aspect of the invention, the fiber-reinforced polyamide material has a composition including greater than about 57% nylon; greater than 0% and less than about 30% glass fiber; greater than 0% and less than about 10% carbon fiber, and greater than 0% and less than about 10% bronze flake.

In accordance with still another aspect of the invention, the fiber-reinforced polyamide material includes greater than 0% and less than about 3% white pigment.

In accordance with a further aspect of the invention, the ball joint socket is a provided in a tie rod end.

In accordance with another aspect of the invention, a method of constructing a ball joint socket is provided. The method includes inserting a bearing constructed as a monolithic piece of fiber-reinforced polyamide material including carbon fibers which extend circumferentially about a concave spherical bearing surface of the bearing into a metal housing and bringing the concave spherical bearing surface into sliding abutment with a metal spherical bearing surface of a stud.

In accordance with yet another aspect of the invention, the method includes the step of providing the fiber-reinforced polyamide material including glass and bronze flakes both of which extend circumferentially about a concave spherical bearing surface.

In accordance with still another aspect of the invention, the method includes the step of providing the fiber-reinforced polyamide material with a composition including greater than about 57% nylon; greater than 0% and less than about 30% glass fiber; greater than 0% and less than about 10% carbon fiber, and greater than 0% and less than about 10% bronze flake.

In accordance with another aspect of the invention, the method includes the step of providing the fiber-reinforced polyamide material with greater than 0% and less than about 3% white pigment.

In accordance with another aspect of the invention, the method includes the step of inserting the ball joint socket in a tie rod end.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a cross-sectional view of a tie rod end including a ball joint socket constructed in accordance with one presently preferred aspect of the invention;

FIG. 2 is a plan view of an upper bearing of the ball joint socket of FIG. 1 constructed in accordance with one aspect of the invention;

FIG. 3 is a plan view of a lower bearing of the ball joint socket of FIG. 1; and FIG. 4 is a perspective and elevation view of the upper bearing of the ball joint socket of FIG. 1 and showing a direction of a flow of material during an injection molding process.

DETAILED DESCRIPTION OF PRESENTLY PREFERRED EMBODIMENTS

Referring in more detail to the drawings, FIG. 1 illustrates a ball joint 10, shown by way of example as an outer tie rod end ball-type joint assembly, referred to hereafter as tie rod end 10, constructed in accordance with one exemplary embodiment of the present invention. The tie rod end 10 has a tie rod housing 11 with an end 13 configured for attachment to an inner steering component (not shown), such as an inner tie rod assembly via an adjuster, for example. The tie rod end 10 also includes a stud 12 which has a spherical bearing surface 14 at one end, represented substantially as a ball 14, and has an opposite end 18 configured for attachment to a vehicle steering member (not shown), such as by threads 19, for example. The vehicle steering member could be, for example, a steering knuckle (not shown) of a vehicle.

The tie rod end 10 further includes a ball socket assembly, referred to hereafter as socket assembly 20, with an upper (or first) bearing 22 and a lower (or second) bearing 24. The upper and lower bearings 22, 24 are configured for sliding engagement with the spherical bearing surface 14 of the stud 12. In use, the loading between the spherical bearing surface 14 of the stud 12 and the socket assembly 20 is radial or substantially radial, such as between about 400 to 1500 lbs, while the axial loading imparted on the tie rod end 10 in use is negligible. In the exemplary embodiment, a desired preload on the spherical bearing surface 14 of the stud 12 is established during assembly by roll forming or folding an end of a socket 21 of the tie rod housing 11 about an end cap 23 with a spring washer 25 being captured between the upper bearing 22 and the end cap 23. The upper and lower bearings 22, 24 have spherical bearing surfaces which are configured to slidingly engage opposite sides of the spherical bearing surface 14 of the stud 12.

The heavily loaded lower bearing 24 can be provided, for example, as a standard metal bearing and can further be coated with a low-friction coating 26. The lower bearing 24 can be constructed of any suitable hardened metal, such as a sintered powder metal, for example.

The lower bearing 24 of the exemplary embodiment has an outer cylindrical wall 28 which extends between opposite ends, and the wall 28 is sized suitably for receipt in the housing or socket 21 of the tie rod 11. The lower bearing 24 has a substantially concave spherical bearing surface 32 with a generally similar spherical curvature as the spherical bearing surface 14 of the stud 12 for sliding abutment therewith. As best shown in FIG. 3, the lower bearing 24 of the exemplary embodiment has a plurality of lubrication grooves 34 which extend radially into the bearing surface 32. The grooves 34 extend between and through the opposite ends of the lower bearing 24 and function primarily to transfer lubricant, such as grease, for example, to prevent pressurization of the lubricant within the socket assembly 20 and to reduce friction between the bearings 22, 24 and the spherical bearing surface 14 of the stud 12, thereby extending the useful life of the tie rod end 10. It should be understood that the grooves 34 can be formed with a multitude of shapes and depths, as desired.

The stud 12 may be constructed from any suitable metal, such as AISI 4140 steel, for example. The spherical bearing surface 14 is represented here as being generally spherical in shape and is further represented, by way of example, as being free from any lubrication coating, although a lubricating coating could be formed on its outer surface, if desired.

The upper bearing 22 is constructed from a novel thermoplastic fiber-reinforced polyamide 27 (nylons), such as nylon 6/6 (polyhexamethylene adipamide). Due to the novel thermoplastic fiber-reinforced polyamide, the upper bearing 22 exhibits a long and useful life, substantially comparable to a metal bearing; provides the tie rod end 10 with a desirable "out-of-box" feel and is economical in manufacture, being much less costly to make than a standard metal bearing.

In manufacture, the fiber-reinforced polyamide material of the upper bearing 22 is injection molded to provide the upper bearing 22 with its enhanced performance characteristics. Referring now to FIG. 4, during injection molding, the thermoplastic material flows through a sprue in a radial direction, represented generally at 38, whereupon the material flows circumferentially within the mold cavity, as represented generally by arrows 40, to form the geometric configuration of the upper bearing 22. As shown in FIG. 2, the fibers dispersed within the nylon 41 include carbon fibers 42, glass fibers 44 and bronze flakes 46. The fibers 42, 44, and flakes 46 are uniformly dispersed in the nylon 41, thereby providing the upper bearing 22 as a homogeneous or substantially homogeneous, solid monolithic piece of fiber-reinforced material 27, "as injection molded". The fiber-reinforced material 27 of the upper bearing 22 includes the following composition of the nylon and fibers: greater than about 57% nylon 41; greater than 0% and less than about 30% glass fiber 44; greater than 0% and less than about 10% carbon fiber 42, and greater than 0% and less than about 10% bronze flake 46, and if desired for enhanced appearance, less than about 3% white pigment. The nylon 41 provides strength and lubricity; the glass fibers 44 provide strength; the carbon fibers 42 provide strength and lubricity; and the bronze flakes 46 provide durability and enhanced appearance. The finished upper bearing 22 has an 80 Shore D durometer hardness.

The upper bearing 22 has an outer cylindrical wall 48 which extends between opposite ends, and the wall 48 is sized suitably for receipt in the lower bearing 24. The upper bearing 22 has a substantially concave spherical bearing surface 50 having a generally similar spherical curvature as the spherical bearing surface 14 of the stud 12 for sliding abutment of the circumferentially extending fibers 42, 44, flakes 46 and nylon 41 therewith. The upper bearing 22 is also shown as having a plurality of lubrication grooves 52 which extend radially into the bearing surface 50. The grooves 52 extend between and through the opposite ends of the upper bearing 22 and function primarily to transfer lubricant, such as grease, for example, to prevent pressurization of the lubricant within the bearing assembly 20 and to reduce friction between the bearing assembly 20 and the spherical bearing surface 14 of the stud 12, thereby extending the useful life of the tie rod end 10.

An exemplary method of constructing a ball joint 10 is provided. The exemplary method includes the step of injection molding a bearing 22 into a monolithic piece of fiber-reinforced polyamide material including carbon fibers 42 which extend circumferentially about a concave spherical bearing surface 50. The method continues with the step of inserting the bearing 22 into sliding abutment with a metal spherical bearing surface 14 of a stud 12. The bearing 22 may be injection molded to have a composition including greater than about 57% nylon 41; greater than 0% and less than about 30% glass fiber 44; greater than 0% and less than about 10% carbon fiber 42; and greater than 0% and less than about 10% bronze flake 46 with the glass fibers 44 and bronze flakes 46 both extending circumferentially about the concave spherical bearing surface 50.

Obviously, many modifications and variations of the present invention are possible in light of the above teachings. For example, as discussed above, it is contemplated that the spherical bearing surface 14 of the stud 12 could have grooves for channeling grease, with the upper and lower bearings 22, 24 being formed without grooves. It is, therefore, to be understood that within the scope of the appended claims, the invention may be practiced otherwise than as specifically described.

What is claimed is:
1. A ball joint, comprising:
a housing;
a stud having a spherical bearing surface disposed in said housing;

a bearing having a concave spherical bearing surface brought into sliding abutment with said spherical bearing surface of said stud; and said bearing being a monolithic piece of fiber-reinforced polyamide material including a plurality of individual carbon fibers, substantially all of said individual carbon fibers being substantially oriented in a circumferential direction.

2. The ball joint as set forth in claim 1 wherein said fiber-reinforced polyamide material includes glass fibers and bronze flakes both extending circumferentially about said concave spherical bearing surface.

3. The ball joint as set forth in claim 2 wherein said fiber-reinforced polyamide material has a composition including greater than about 57% nylon; greater than 0% and less than about 30% glass fiber; greater than 0% and less than about 10% carbon fiber, and greater than 0% and less than about 10% bronze flake.

4. The ball joint as set forth in claim 3 wherein said fiber-reinforced polyamide material includes greater than 0% and less than about 3% white pigment.

5. The ball joint as set forth in claim 1 wherein said bearing is an upper bearing and further including a lower bearing.

6. The ball joint as set forth in claim 5 wherein said upper bearing is received in said lower bearing.

7. The ball joint as set forth in claim 5 wherein at least one of said upper and lower bearings is provided with lubrication grooves.

8. The ball joint as set forth in claim 5 wherein said lower bearing is provided with a low-friction coating.

9. The ball joint as set forth in claim 5 further including an end cap and a washer spring captured between said upper bearing and said end cap.

10. The ball joint as set forth in claim 1 wherein said stud has an end with threads opposite of said spherical bearing surface.

11. A method of constructing a ball joint, comprising:

injection molding a polyamide material with carbon fibers into a bearing with a concave spherical bearing surface wherein during the injection molding process the polyamide material flows circumferentially to substantially orient the carbon fibers within the polyamide material in a circumferential direction throughout the bearing; and inserting the fiber-reinforced polyamide bearing with the substantially circumferentially aligned carbon fibers into a metal housing and bringing the concave spherical bearing surface into sliding abutment with a metal spherical bearing surface of a stud.

12. The method of claim 11 further including providing the fiber-reinforced polyamide material including glass and bronze flake both extending circumferentially about the concave spherical bearing surface.

13. The method of claim 12 further including providing the fiber-reinforced polyamide material having a composition including greater than about 57% nylon; greater than 0% and less than about 30% glass fiber; greater than 0% and less than about 10% carbon fiber, and greater than 0% and less than about 10% bronze flake.

14. The method of claim 13 further including providing the fiber-reinforced polyamide material includes greater than 0% and less than about 3% white pigment.

15. The method as set forth in claim 11 further including the step of injection molding a bearing before the step of inserting the bearing into sliding abutment with the metal spherical surface of the stud.

\* \* \* \* \*